UNITED STATES PATENT OFFICE.

GEORGE BACKETT, OF NEW YORK, N. Y.

IMPROVED SALVE.

Specification forming part of Letters Patent No. 56,513, dated July 24, 1866.

*To all whom it may concern:*

Be it known that I, GEORGE BACKETT, of the city, county, and State of New York, have invented a new and Improved Salve; and I do hereby declare that the following is a full, clear, and exact description thereof, which will enable others skilled in the art to make and use the same.

The present invention relates to a new salve, especially intended for use upon boils, sores, and other eruptions of the skin or flesh, cuts, wounds, and other bruises, abscesses, &c.; and it is composed of the following ingredients, mixed together in about the proportions and in the manner explained, viz: one and one-half pound lead-plaster; one-quarter pound Burgundy pitch; one-half pound yellow rosin; two ounces black pitch; one ounce strained gum-galbanum.

The Burgundy pitch, yellow rosin, and black pitch are first boiled or melted, or otherwise reduced to a liquid mass or a soluble state, when the lead-plaster is added to it, and finally the gum-galbanum, which completes the salve and renders it fit to be used for any of the purposes stated, or to any other to which it may be found applicable.

Having thus described my invention, I claim as new and desire to secure by Letters Patent—

The salve made of the several ingredients and mixed together in or about the proportions stated, for the purpose specified.

The above specification of my invention signed by me this 18th day of June, 1866.

GEORGE BACKETT.

Witnesses:
WM. F. McNAMARA,
ALBERT W. BROWN.